United States Patent
Thrap

[15] 3,694,745
[45] Sept. 26, 1972

[54] METHOD AND CIRCUIT FOR PROVIDING A FREQUENCY METER HAVING IMPROVED GATE PERIOD MEANS

[72] Inventor: Guy A. Thrap, San Diego, Calif.

[73] Assignee: California Instruments Co., Division of Aiken Industries, Inc., San Diego, Calif.

[22] Filed: Aug. 13, 1971

[21] Appl. No.: 171,523

[52] U.S. Cl. .................324/78 D, 324/79 D, 328/72
[51] Int. Cl. ...........................................G01r 23/02
[58] Field of Search .....324/78, 79, 161; 328/72, 140

[56] References Cited

UNITED STATES PATENTS

| | | | |
|---|---|---|---|
| 3,518,540 | 6/1970 | Roberts | 324/79 D |
| 3,518,983 | 7/1970 | Joyensen | 324/78 E |
| 3,626,204 | 12/1971 | Brandon | 324/78 E |

*Primary Examiner*—Alfred E. Smith
*Attorney*—Carl R. Brown and Neil F. Martin

[57] ABSTRACT

A frequency meter in which a reference voltage is applied to an integrator circuit for the time period required to count out a given reference frequency, and the polarity of the reference voltage is then switched discharging the integrator circuit for the same time period to provide a fixed gate time period for counting the Hertz of an unknown frequency and displaying same.

9 Claims, 3 Drawing Figures

PATENTED SEP 26 1972

3,694,745

INVENTOR.
GUY C. THRAP
BY Brown & Martin
ATTORNEYS

METHOD AND CIRCUIT FOR PROVIDING A FREQUENCY METER HAVING IMPROVED GATE PERIOD MEANS

BACKGROUND OF THE INVENTION

There are several known frequency meters. These frequency meters count a given frequency for a given time period, which frequency is then displayed. It is advantageous to have a new, improved and different means for fixing a fixed gate period to count the Hertz of an unknown frequency.

SUMMARY OF THE INVENTION

In an embodiment of this invention a method and structure operate to count the Hertz of a frequency of interest. The particular gate period during which the Hertz are counted, is set by charging an integrator circuit from a voltage source while simultaneously counting the cycles of the reference frequency. Thus the integrator is charged for the time period required to count out the counter. The counter then provides a signal to a switch circuit that reverses the polarity of the voltage source across the integrator. A frequency of interest is then fed to the counter to count the Hertz of the reference frequency for the time period required to discharge the integrator. Since the polarity of the reference voltage source was reversed across the integrator circuit, the integrator circuit is discharged at the same rate that it was charged. Thus the time periods are the same. When the integrator circuit reaches zero potential, a zero potential detector applies a signal to the counter that resets the counter as well as causes the Hertz count in the counter to be displayed, which is the frequency of the frequency of interest. Since the counter period is normally set at one second, the frequency displayed is a direct read-out of the Hertz of the frequency of interest.

Thus there is provided an accurate, fixed, gate period to count an unknown frequency for direct Hertz display.

It is therefore an object of this invention to provide a new and improved method and circuit for providing a frequency meter.

Other objects and many attendant advantages will become more apparent upon a reading of the following detailed description of the invention and an examination of the drawings wherein like reference numerals designate like parts throughout and in which.

Figure 1:
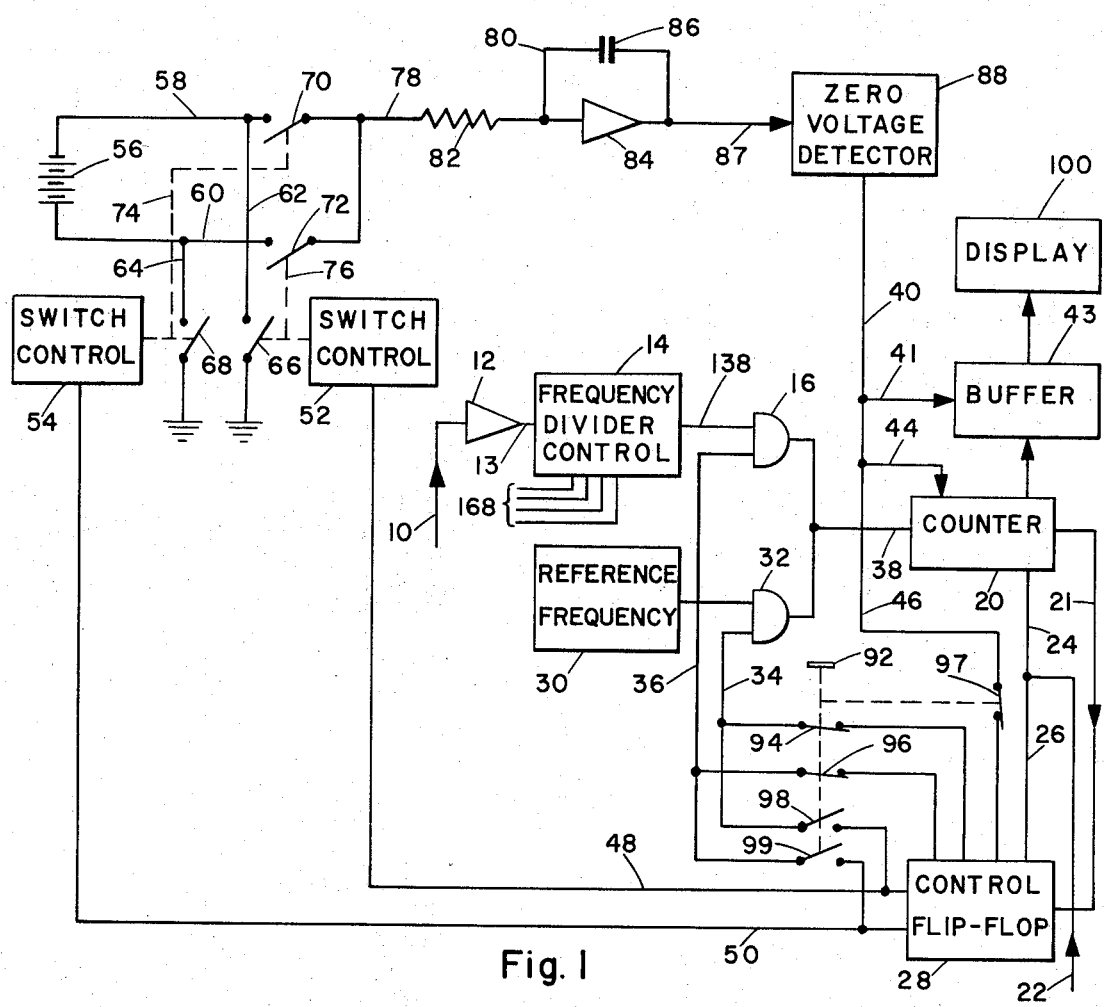
FIG. 1 illustrates a block and schematic diagram of the embodiment of the invention.
Figure 3:
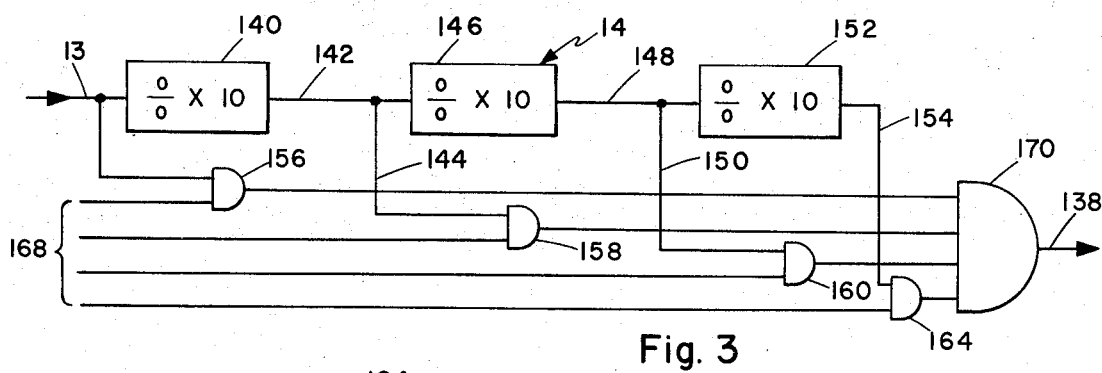
FIG. 3 is a block diagram and schematic diagram of the frequency divider control circuit of FIG. 1.

Referring now to FIG. 1 of the drawings, a source 30 of a reference frequency provides a stable output frequency that, for example, may be in the order of 10,000 Hertz. The source 30 may be a crystal controlled oscillator for stability. This output frequency is fed through OR gate 32 and line 38 to a counter 20. Counter 20 may comprise a known decade counter. Counter 20 counts the cycles in the reference frequency as controlled by the control flip flop circuit 28. When the control flip flop circuit 28 provides an output signal through line 50, this signal level energizes switch control 54 to close switch contacts 68 and 70. Upon closing these switch contacts, a DC voltage is fed from DC voltage source 56 through line 58, closed switch contact 70 and line 78 to the integrator circuit 80. The other side of the voltage source 56 is connected through line 64 to ground. The DC voltage source 56 may be any standard voltage cell capable of providing a stable DC voltage output to the integrator circuit 80. The integrator circuit 80 comprises any known integrator circuit having a capacitor circuit 86, input resistance 82 and an amplifier 84.

The output signal from the control flip flop circuit 28 through line 36 inhibits OR gate 16 so that no signal passes through gate 16 to the counter 20. During this period of time when counter 20 is counting out the cycles of the reference frequency from source 30, the integrator capacitor 86 is charged by DC voltage from source 56 and amplifier 84. When the counter 20 reaches full count it provides an output signal through line 21 advancing the control flip flop circuit 28 to switch the output signal from line 50 and switch control 54 to line 48 and switch control 52. Switch control 54 opens switch contacts 68 and 70 and switch control 52 closes switch contacts 66 and 72. This reverses the polarity of the voltage supplied to the integrator 80. Also a signal through line 34 inhibits OR gate 32 and the signal in line 36 to OR gate 16 is terminated gating OR gate 16.

A signal having a frequency of interest is fed through line 10, amplifier 12, line 13 and frequency divider control 14 to OR gate 16. Since OR gate 16 is now gated, this frequency of interest signal passes through line 38 to counter 20. Counter 20, having automatically reset to zero count on counting-out the cycles of the reference frequency, now begins to count the cycles of the frequency of interest signal. This count continues during the period of time that the integrator circuit is being discharged through the DC power source 56. Upon the integrator circuit 80 and specifically capacitor 86 discharging to zero, this zero potential in output line 87 is detected by the zero voltage detector 88 that supplies an output pulse through lines 40 and 44 to the counter 20 terminating the counting of the counter 20 and resetting the count to zero count. The counter again supplies an output pulse through line 21 that returns the control flip flop circuit to the condition for supplying an output level signal to lines 50 and 36. Simultaneously the output pulse from the zero voltage detector 88 is applied through line 41 to a buffer circuit 43 that stores the last count of the counter 20, and displays this count on display 100. Further the output pulse from the zero voltage detector is fed through line 46 to the control flip flop circuit to override the circuit to a zero output condition. This opens switch controls 52 and 54. During this mode of operation the switch contacts 94, 96 and 97 of switch 92 are closed and the switch contacts 98 and 99 are open. The override signal in line 46 also closes the circuit through contacts 94 and 96 to inhibit gates 16 and 32 and prevent signals from passing to counter 20. Thus the display 100 displays the last count of the counter that counter Hertz of the particular frequency of interest of the input signal.

Figure 2:
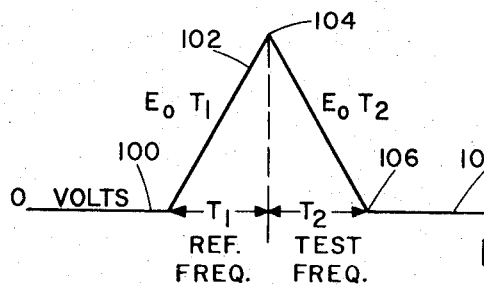
FIG. 2 illustrates the waveform diagram of the timing involved in the storage of voltage in the integrator circuit.

It may be observed that the output frequency of the reference frequency source 30 is so set that counter 20 counts to five significant digits in 1 second. Thus the time interval $T_1$, see FIG. 2, of the voltage build up 102 or $E_oT_1$ in the integrator circuit 80, is 1 second. Since the same voltage source 56 that was switched across the integrator circuit for charging has its polarity reversed for discharging, the integrator circuit discharges to zero in time $T_2$ that is equal to time $T_1$. Thus the time required to discharge $E_oT_2$ is 1 second and the maximum count of counter 20 and thus the count displayed by display 100, is the direct Hertz read-out of the input frequency of interest.

Amplifier 12, see FIG. 1, is a high gain amplifier that functions to square the waveform of the frequency of interest signal so that it may be processed by the digital circuitry. Frequency divider control 14 functions to reduce the frequency of the frequency of interest signal to the range of the counter 20. For example, when the input frequency has a frequency greater than 10 K Hertz, then the counter 20 counts out prior to the expiration of the time $T_2$. The counter then provides an output signal through line 21 to advance the control flip flop circuit 28 that re-energizes switch control 54 and de-energizes switch control 52. This resets the charging mode of operation to the integrator circuit 80 before the charge in capacitor 80 has been discharged into source 56. Thus the circuit does not reach a zero voltage condition in line 87 that is detectable by zero voltage detector 88, and the zero voltage detector 88 doesn't supply an output pulse to the buffer 43 and thus no display occurs, or the display remains the same. This is easily recognized by the operator who operates push button switches or other known controls (not shown) to energize a designated one of lines 168 to apply, for example, a ground circuit to one of gates 156, 158, 160 or 164 that gates the input frequency signal either directly through OR gate 170 to line 138 or through appropriate frequency divider circuits 140, 146 or 152 and through lines 142, 144, 148, 150 and 154 providing a frequency division of the input frequency to a Hertz that is within the range of the counter 20.

As disclosed, the output of the zero voltage detector 88, provides an output signal through line 46 that opens lines 48 and 50 from the control FF's circuit 28 and causes control FF's circuit 28 to supply inhibiting levels to gates 16 and 32 through lines 34 and 36. This holds the circuit in a non-operational condition and prevents any frequency signal from being applied to the counter 20. In this mode of operation, only a given sequence reading is displayed on display 100. To obtain another sequence reading, a control pulse is fed through line 22 and lines 24 and 26 to the counter 20 and to control flip flops 28 advancing the control flip flops 28 to the condition of providing an output level to line 50, while holding gate 16 closed and gate 32 open. A resetting pulse is supplied to counter 20 to assure that the counter is reset to the zero count. The signal in line 22 may be provided from any suitable known source for programming frequency read-out.

It should also be recognized that the counter 20 and control flip flops 28 are set, by operating switch 92 and closing contacts 98 and 99 and opening contacts 94, 96 and 97, to provide a continuous read-out and display of the frequency of interest on display 100. In this mode, the zero voltage detector 88, only provides that momentary pulse required to reset counter 20 through line 44, and to energize buffer 43 through line 41. The circuit through line 46 is opened by opening contact 97. So when the counter 20 is reset to zero count, the signal in line 21 again supplies the level to line 50 and line 36 to recycle the circuit operation for time $T_1$.

Having described my invention, I now claim:

1. A frequency meter for determining the frequency of a given signal comprising,
an integrator circuit and a counter means,
first means including said counter means for charging said integrator circuit for a first given time period,
second means for discharging said integrator circuit for a second time period that is the same time period as said first given time period,
said counter means being responsive to said second means for counting the cycles of the given signal for said second time period,
and means for displaying the number of cycles counted by said counter means.

2. A frequency meter as claimed in claim 1 including,
means for supplying a reference frequency signal to said counter means,
and said counter means provides a first control signal to said first means upon starting to court the cycles of said reference frequency signal and a second control signal to said first means and a third control signal to said second means upon said counter means counting a given number of cycles of said first control signal.

3. A frequency meter as claimed in claim 2 in which,
said first means includes means for connecting a source of constant DC voltage to said integrator circuit,
and said second means includes switch means responsive to said third control signal for switching the polarity of said DC voltage source across said integrator circuit.

4. A frequency meter as claimed in claim 3 including,
zero detector means for detecting a zero potential condition of said integrator circuit and in response to such detection providing an output signal resetting said counter means.

5. A frequency meter as claimed in claim 4 including,
control means responsive to said counter means and said zero detector for providing control signals to said first means and said second means.

6. A frequency meter as claimed in claim 5 in which,
said given number of counted signals of said first control signal comprises the full count of said counter means,
and said control means is responsive to a signal from said counter means upon said counter means reaching a full count for de-energizing said first means and energizing said second means.

7. The method of counting a frequency comprising the steps of,
counting with a counter the cycles of a given reference frequency to the full count of the counter,
charging an electrical power storage device with a reference DC voltage during the period of the counting,
discharging the storage device by said reference DC voltage, counting the cycles of a signal frequency of interest during the period of discharging the storage device,
and displaying the number of cycles counted.

8. The method of claim 7 is characterized by said electrical power storage device being an integrator circuit.

9. The method of claim 8 including the step of, dividing the frequency of the signal of interest to the range of the counter.

* * * * *